United States Patent Office 3,749,713
Patented July 31, 1973

3,749,713
NOVEL AZIDE COMPOUNDS
Nicholas J. Clecak, San Jose, and Robert J. Cox, Los Gatos, Calif., assignors to International Business Machines Corporation, Armonk, N.Y.
No Drawing. Filed Feb. 28, 1972, Ser. No. 230,033
Int. Cl. C07c 117/00
U.S. Cl. 260—240 R
3 Claims

ABSTRACT OF THE DISCLOSURE

The novel compounds 2,6-bis(p - azidobenzylidene)-4-hydroxycyclohexanone and 2,6-bis(p - azidocinnamylidene)-4-hydroxycyclohexanone have been prepared. They have been found to exhibit unexpected advantages as sensitizers in negative photoresists.

Background of the invention

The present application is concerned with certain novel compounds containing azide groups. The compounds are useful as sensitizers in negative photoresists where they have the unexpected advantage of making it possible to use polymers which previously could not be used.

Prior art

U.S. Pat. 2,940,853 issued June 14, 1960, describes compounds structurally related to those of the present application, but differing in that they lack a hydroxyl group at the 4 position. The prior art compounds are disclosed as being useful as sensitizers for photoresists.

Summary of the invention

Negative photoresists are used extensively, for example, in the field of manufacture of microelectronics. They consist of a polymer and a sensitizer dissolved in a solvent. A typical formulation available commercially consists of 20% polymer, for example cyclized polyisoprene, and 1.5% sensitizer, for example 2,6-bis(p-azidobenzylidene)-cyclohexanone. The solvent for such a system is typically xylene. For years, however, there it has been felt the need to use a wider variety of polymers in making photoresists. When, for example, it is desired to improve such characteristics as adhesion or flexibility by using a material such as polyvinylalcohol as the polymer, it has not been possible to do so, because prior to the present invention, no sensitizer was available which would be sufficiently soluble in a solvent which would also dissolve polyvinylalcohol. The novel compounds of the present invention overcome this difficulty.

The method of preparing the compounds is illustrated in the examples below. The use of the compounds in formulating photoresists is analogous to the use of presently employed compounds.

While the invention will be particularly shown and described with reference to preferred embodiments thereof, it will be understood by those skilled in the art that various changes in the form and details may be made therein without departing from the spirit and scope of the invention.

EXAMPLE I 2,6-bis(p-azidobenzylidene)-4-hydroxycyclohexanone

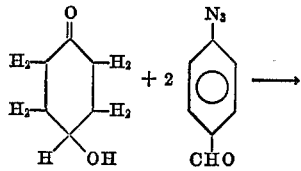

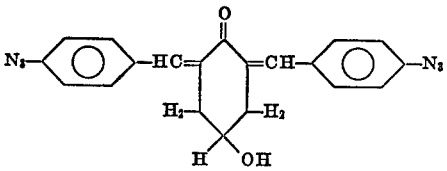

A solution of 4-hydroxycyclohexanone (11.4 g.) p-azidobenzaldehyde (32 g.) and 1 g. of 25% aqueous sodium hydroxide in 50 ml. of ethanol, protected from light, was stirred for six hours at room temperature. The solids were filtered and an additional 1 g. of 25% sodium hydroxide added to the filtrate. This solution was then allowed to stir overnight. The solids were filtered, combined with the solids from the first filtration and recrystallized from ethanol. They melted at 148° with decomposition. These yellow solids were shown to be the subject compound by NMR (nuclear magnetic resonance). The purity was established by TLC (thin layer chromatography) and combustion analysis.

Calcd. for $C_{20}H_{20}N_6O_2$ (percent): C, 64.51; H, 4.32; N, 22.57. Found (percent): C, 64.24; H, 4.34; N, 22.52.

The solubility of this novel compound in ethyl cellulose acetate is 2.5 times that of the corresponding compound of the prior art which lacks the hydroxyl group at the 4 position. In ethyl alcohol the solubility of the above novel compound is 10.7 times that of the prior art compound.

EXAMPLE II 2,6-bis(p-azidocinnamylidene)-4-hydroxycyclohexanone

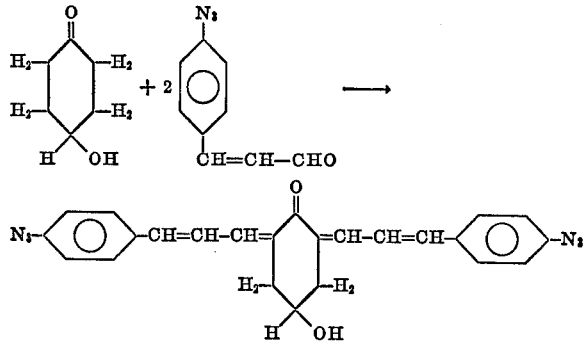

This compound was prepared in the same manner as that of Example I, using 0.85 g. of 4-hydroxycyclohexanone, 1.8 g. of p-azidocinnamaldehyde and 1 g. of 25% aqueous sodium hydroxide in 30 ml. of ethanol. It was recrystallized from toluene, melted at 180° with decomposition, and was pure by TLC.

Calcd. for $C_{24}H_{20}N_6O_2$ (percent): C, 67.91; H, 4.74; N, 19.79. Found (percent): C, 67.67; H, 4.85; N, 19.64.

The solubility of this novel compound in ethyl cellulose acetate is 8.5 times that of the prior art compound not having a hydroxyl group at the 4 position. The solubility of the novel compound in ethyl alcohol is 84 times greater than that of the prior art compound.

What is claimed is:

1. A compound selected from the group consisting of 2,6-bis(p-azidobenzylidene) - 4 - hydroxycyclohexanone and 2,6-bis(p-azidocinnamylidene) - 4 - hydroxycyclohexanone.

2. A compound as claimed in claim 1, namely 2,6-bis-(p-azidobenzylidene)-4-hydroxycyclohexanone.

3. A compound as claimed in claim 1, namely 2,6-bis-(p-azidocinnamylidene)-4-hydroxycyclohexanone.

(References on following page)

References Cited

UNITED STATES PATENTS 2,940,853  6/1960  Sagura et al. ---------- 96—91 N
3,591,378  7/1971  Altman ------------ 96—91 N

OTHER REFERENCES

Chemical Abstracts, vol. 72, p. 57 (abst. 67916h) (1970).

Chemical Abstracts, vol. 72, p. 111 (abst. 33381q) (1970).

Chemical Abstracts, vol. 72, p. 451 (abst. 27035p) (1970).

Chemical Abstracts, vol. 72, p. 482 (abst. 84918c) (1970).

JOHN D. RANDOLPH, Primary Examiner

U.S. Cl. X.R.

96—36.2, 91 N, 115; 260—349